(12) United States Patent
Maro et al.

(10) Patent No.: US 8,479,690 B2
(45) Date of Patent: Jul. 9, 2013

(54) ADVANCED INTERNAL COMBUSTION ENGINE

(75) Inventors: Randall A. Maro, Davenport, IA (US); Robert A. Matousek, Milan, IL (US)

(73) Assignee: Maro Performance Group, LLC IA (US)

(*) Notice: Subject to any disclaimer, the term of this patent is extended or adjusted under 35 U.S.C. 154(b) by 1529 days.

(21) Appl. No.: 11/724,863

(22) Filed: Mar. 16, 2007

(65) Prior Publication Data

US 2008/0223332 A1 Sep. 18, 2008

(51) Int. Cl.
*F02B 47/02* (2006.01)

(52) U.S. Cl.
USPC .................................. 123/25 P; 123/25 R

(58) Field of Classification Search
USPC .............. 123/25 A, 25 B, 25 C, 25 D, 25 E, 123/585, 568.11, 568.12, 568.15, 25 P
See application file for complete search history.

(56) References Cited

U.S. PATENT DOCUMENTS

| | | | |
|---|---|---|---|
| 1,108,608 A | 8/1914 | Nedoma | |
| 2,775,961 A | 1/1957 | Petre | |
| 2,879,753 A | 3/1959 | McKinley | |
| 3,672,341 A | 6/1972 | Smith et al. | |
| 3,696,795 A * | 10/1972 | Smith et al. | 123/1 A |
| 3,709,203 A | 1/1973 | Cettin et al. | |
| 3,792,690 A * | 2/1974 | Cooper | 123/3 |
| 3,800,761 A | 4/1974 | Sata | |
| 3,845,745 A | 11/1974 | Dunlap et al. | |
| 3,961,609 A | 6/1976 | Gerry | |
| 4,064,840 A * | 12/1977 | Vierling | 123/3 |
| 4,558,665 A | 12/1985 | Sandberg et al. | |
| 4,883,023 A | 11/1989 | Tsang et al. | |
| 5,400,746 A * | 3/1995 | Susa et al. | 123/25 C |
| 5,636,619 A | 6/1997 | Poola et al. | |
| 5,678,526 A | 10/1997 | Cullen et al. | |
| 6,405,720 B1 * | 6/2002 | Collier, Jr. | 123/568.12 |

FOREIGN PATENT DOCUMENTS

GB 2342390 9/2005
WO WO 2005083243 9/2005

* cited by examiner

*Primary Examiner* — Noah Kamen
*Assistant Examiner* — Hung Q Nguyen
(74) *Attorney, Agent, or Firm* — Jerry K. Mueller, Jr.; Mueller Law, LLC

(57) ABSTRACT

An internal combustion engine power cycle wherein a combustion chamber is fitted with an inlet valve, an outlet valve, and movable piston coupled to perform work, includes an generator to form a stream of greater than about 95% molecular oxygen from atmospheric air and a nitrogen waste gas stream; a source of fuel; and a source of liquid water. The power cycle includes admission of the molecular oxygen into the chamber, injection of the fuel into the chamber with combustion, and injection of atomized water into the chamber for generation of steam.

15 Claims, 5 Drawing Sheets

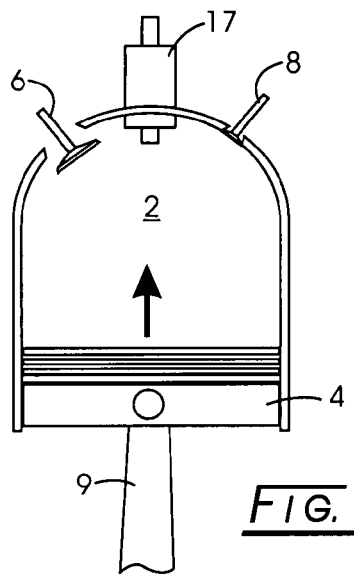
FIG. 2
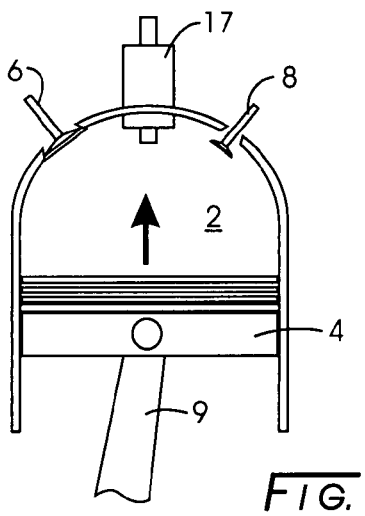
FIG. 3
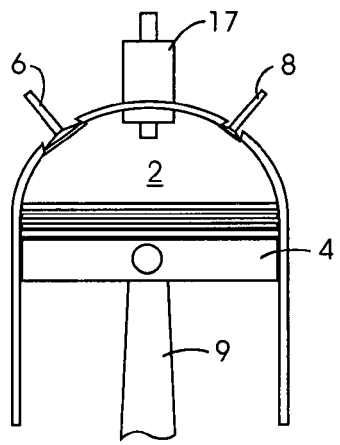
FIG. 4
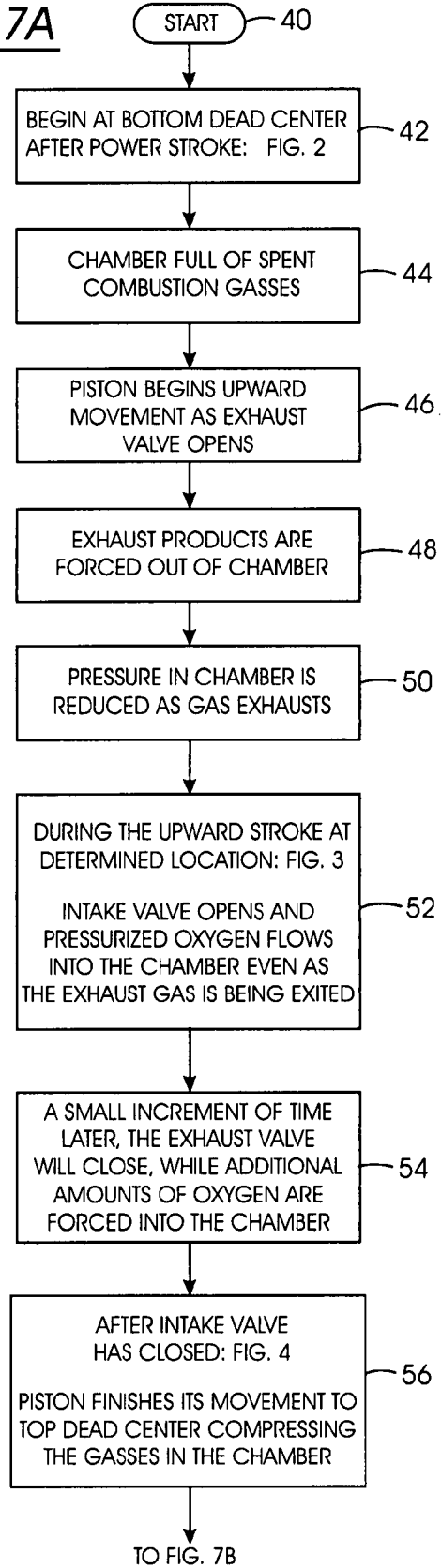

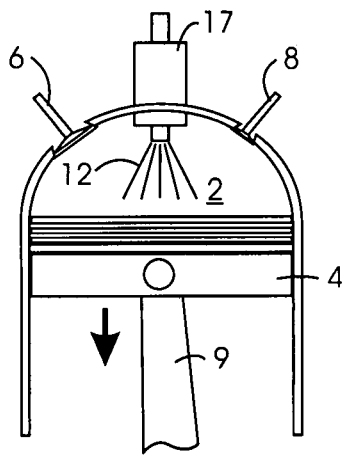

FIG. 5

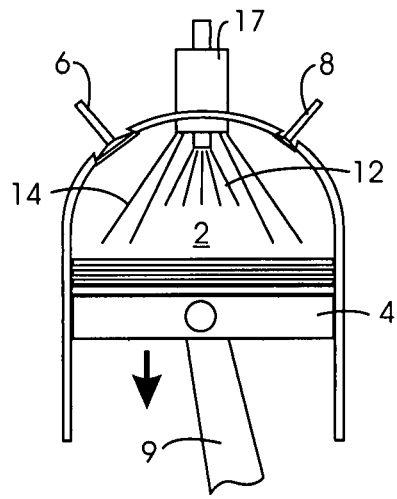

FROM FIG. 7A

↓

AT OR SLIGHTLY AFTER TOP DEAD CENTER: FIG. 5

FUEL IS INJECTED INTO THE CHAMBER — 58

↓

IGNITION RESULTS AND COMBUSTION BEGINS — 60

↓

PISTON IS DRIVEN DOWNWARD — 62

↓

INCREMENTALLY AFTER IGNITION: FIG. 6

WATER IS INJECTED IN VERY FINE MIST TO BEGIN TO ABSORB THE HEAT OF COMBUSTION AND BE CONVERTED INTO STEAM, THUS EXPANDING RAPIDLY AND DRIVING THE PISTON DOWNWARD WITH MORE FORCE — 64

↓

THE FUEL INJECTION AND WATER INJECTION CONTINUES WITH THE EXPANSION DRIVING THE PISTON DOWN TOWARD BOTTOM DEAD CENTER — 66

↓

THE CYCLE IS COMPLETE AT BOTTOM DEAD CENTER — 68

↓

( RETURN ) — 70

FIG. 13B

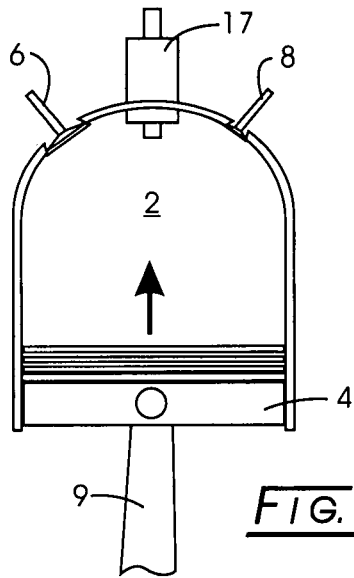

FIG. 11

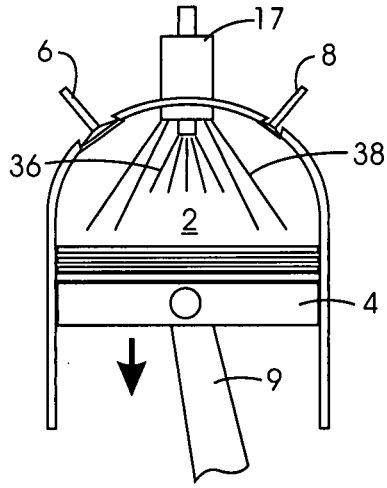

FIG. 12

FROM FIG. 13A
↓
THE PISTON REACHES BOTTOM DEAD CENTER: FIG. 11 — 86
↓
THE INTAKE ENDS, THE INTAKE VALVE CLOSES, AND THE COMPRESSION STROKE BEGINS AS THE PISTON MOVES UPWARD — 88
↓
THE PISTON MOVES UP TO TOP DEAD CENTER WHILE COMPRESSING THE GASSES IN THE CHAMBER — 90
↓
AT OR JUST AFTER TOP DEAD CENTER: FIG. 12 — 92
↓
THE FUEL INJECTOR INJECTS FUEL INTO THE CHAMBER AND COMBUSTION IS INITIATED AND THE PRESSURE FORCES THE PISTON DOWNWARD — 94
↓
WATER IS INJECTED IN VERY FINE MIST TO BEGIN TO ABSORB THE HEAT OF COMBUSTION AND BE CONVERTED INTO STEAM, THUS EXPANDING RAPIDLY AND DRIVING THE PISTON DOWNWARD WITH MORE FORCE — 96
↓
THE FUEL INJECTION AND WATER INJECTION CONTINUES WITH THE EXPANSION DRIVING THE PISTON DOWN TOWARD BOTTOM DEAD CENTER — 98
↓
THE 4 CYCLE IS COMPLETE AT BOTTOM DEAD CENTER — 100
↓
( RETURN ) — 102 ns depend in part on fuel combustion within the engine. Combustion, in turn, depends on the materials fed into the engine, the oxygen, and on the conditions of such combustion. Air typically forms the largest feed stream into a conventional engine. This air contains mostly molecular nitrogen, $N_2$, and molecular oxygen, $O_2$, although other components also exist in the air.

ADVANCED INTERNAL COMBUSTION ENGINE

CROSS-REFERENCE TO RELATED APPLICATIONS

None

STATEMENT REGARDING FEDERALLY SPONSORED RESEARCH

Not applicable.

BACKGROUND

The present invention generally relates to internal combustion engines and more particularly to an internal combustion engine (both two-stroke and 4-stroke engines) that uses directly injected molecular oxygen, viz., $O_2$, with concomitant suppression of by-product $N_2$, $NO_x$ gases (herein often referred to as "nitrogen gases").

The overall efficiency of an internal combustion engine, or simply "engine" for present purposes, depends in part on the amount of fuel that can be burned in any given cycle. In recent years, environmental concerns have had an increasing effect on such engines. For example, the air/fuel mixture fed into the engine typically is adjusted to prevent complete combustion so that the catalytic converter will be able to reduce emitted nitrogen oxides to the level required by governmental standards. However, since such an adjustment prevents complete combustion, increased amounts of unburned hydrocarbons and carbon monoxide result.

Heretofore, WO 2005083243 proposes an on-board oxygen generator employing a pressure swing adsorption or other process to generate oxygen for feeding to the intake manifold of an internal combustion engine.

U.S. Pat. No. 5,678,526 proposes to monitor an internal combustion engine to control emissions by adding enriched air generated by a membrane to the air intake manifold.

U.S. Pat. No. 5,636,619 proposes to enrich air via a membrane and feed such enriched air to an internal combustion engine during cold start up periods to reduce emissions.

U.S. Pat. No. 5,400,746 proposes to add oxygen enriched air, atomized fuel, and atomized water into the combustion chamber of an internal combustion engine to increase its burning efficiency.

U.S. Pat. No. 4,883,023 proposes to add oxygen enriched air and moisture to the intake of a turbocharger, which supplies pressurized air to an internal combustion engine.

U.S. Pat. No. 4,558,665 proposes to directly inject water into each cylinder of a turbocharged internal combustion engine.

U.S. Pat. No. 3,961,609 proposes to store an compound, which releases oxygen upon heating, on board a vehicle for passing such oxygen into an internal combustion engine for decreasing hydrocarbon and oxide emissions.

U.S. Pat. No. 3,845,745 proposes a water injection system for an internal combustion engine.

U.S. Pat. No. 3,800,761 proposes to mix oxygen and an inert gas other than nitrogen for passing into an internal combustion engine.

U.S. Pat. No. 3,792,690 proposes to burn oxygen, water vapor, and carbon dioxide in an internal combustion engine.

U.S. Pat. No. 3,709,203 proposes to use the exhaust heat from an internal combustion engine to heat an alkali metal perchlorate salt to generate oxygen for combustion in the engine.

U.S. Pat. No. 3,672,341 proposes a combustion cycle for an internal combustion engine that utilizes oxygen, fuel, and water vapor with an injection schedule.

U.S. Pat. No. 2,879,753 proposes a water injection system for an internal combustion engine.

U.S. Pat. No. 2,775,961 proposes to generate oxygen from an oxygen-generating compound for injection into an internal combustion engine.

U.S. Pat. No. 1,108,608 proposes to decomposes hydrogen peroxide into oxygen and water for combusting in an engine.

British published patent application serial number GB 2,342,390 proposes to enrich air via a membrane and feed such enriched air to an internal combustion engine.

Despite these proposals, clean burning engines still have eluded the skilled artisan, despite their need.

BRIEF SUMMARY

An internal combustion engine power cycle wherein a combustion chamber is fitted with an inlet valve, an outlet valve, and movable piston coupled to perform work, includes a generator to form a stream of greater than about 95% molecular oxygen from atmospheric air and a nitrogen waste gas stream; a source of fuel; and a source of liquid water. The power cycle includes admission of the molecular oxygen into the chamber, injection of the fuel into the chamber with combustion, and injection of atomized water into the chamber for generation of steam.

A power cycle method includes the steps of generating a stream of greater than about 95% molecular oxygen from atmospheric air and a nitrogen waste gas stream. Molecular oxygen is fed into a combustion chamber fitted with an inlet valve, an outlet valve, and movable piston coupled to perform work. A combustible fuel is injected into the chamber with combustion ensuing in the chamber. Atomized water is injected into the chamber for generating steam to further drive the power cycle.

BRIEF DESCRIPTION OF THE DRAWINGS

For a fuller understanding of the nature and advantages of the present invention, reference should be had to the following detailed description taken in connection with the accompanying drawings, in which:

FIGS. 2-6 show the cylinder assembly of FIG. 1 for a four-stroke and for a two-cycle engine;

FIGS. 7A and 7B are a power stroke event flow diagram drawn along side FIGS. 2-6 for showing each step of a single stroke of the illustrated two-cycle cylinder;

FIGS. 8-12 show the cylinder assembly of FIG. 1 for full stroke for a four-cycle engine; and FIGS. 13A and 13B are a power stroke event flow diagram drawn along side FIGS. 8-12 for showing each step of a single stroke of the illustrated four-cycle cylinder.

Figure 1:
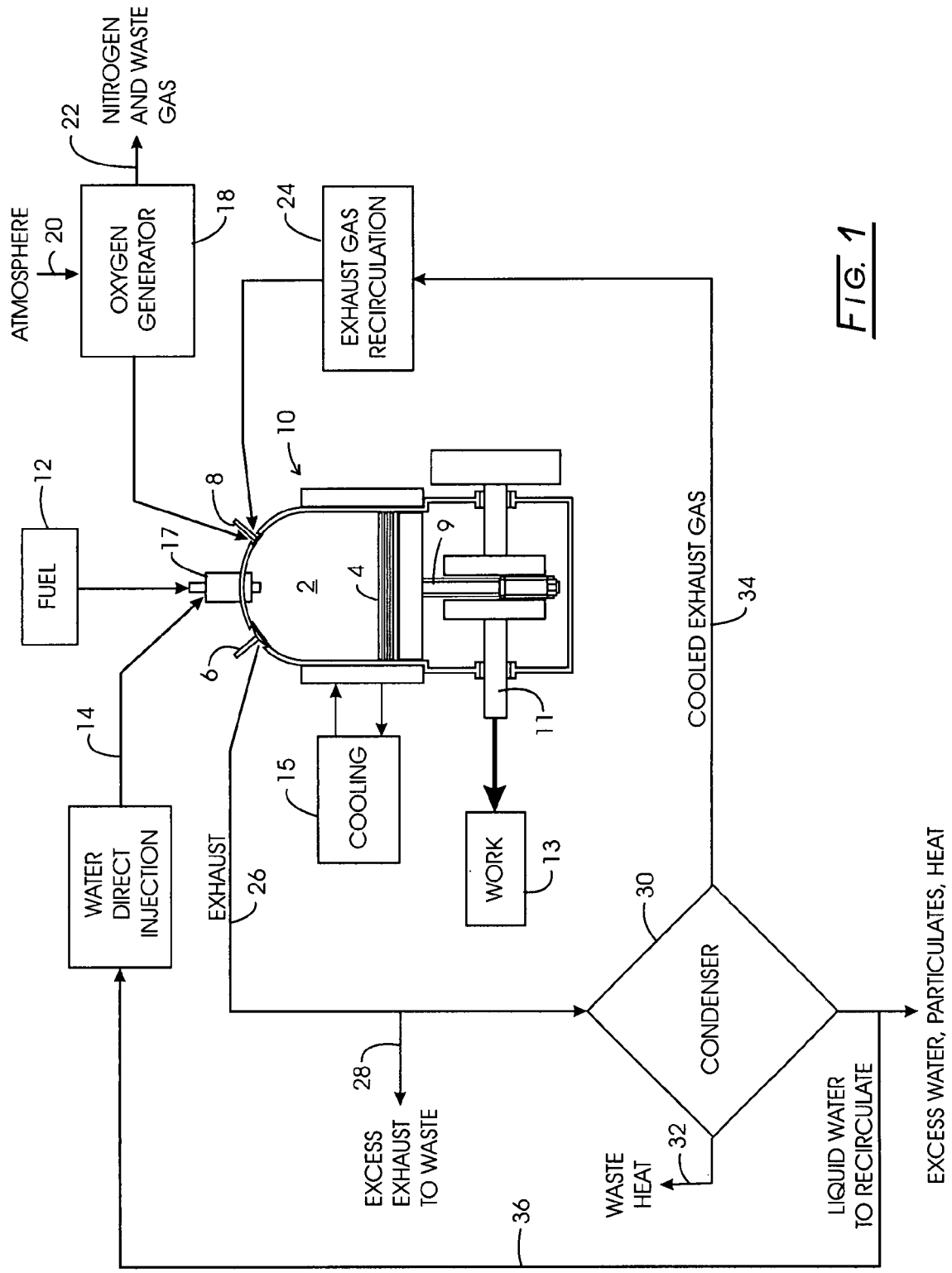
FIG. 1 is a simplistic representation of the disclosed engine wherein a cylinder, piston and rod assembly, and valves are shown in cross-section, along with the various flows of materials into and out of the cylinder or combustion chamber.
Figure 8:
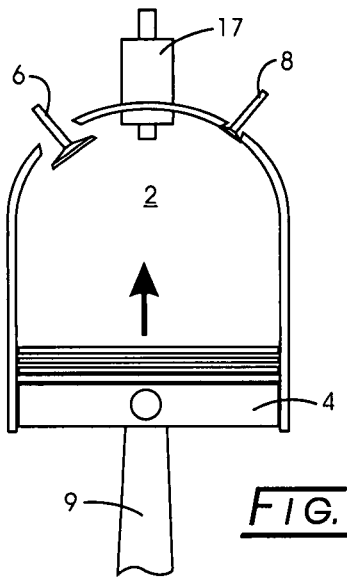

The drawings will be described in further detail below.

DETAILED DESCRIPTION

I. System Definitions

A founding hypothesis of this disclosure is the idea that the performance characteristics of an internal combustion engine relative to power output, fuel efficiency, and exhaust emissions can be significantly altered (enhanced) by removing a significant portion of the nitrogen gas from the intake air delivered to the combustion chamber.

1. Oxygen Generator and Intake System

The first component of the system is a unit that can admit atmospheric air and divide its output into a stream of (ostensible pure or ~95% purity) oxygen (molecular oxygen or $O_2$) and another separate stream of gases (mostly Nitrogen, $N_2$) other than oxygen. The purpose of this step is to provide to an engine an inlet air stream that is ostensibly pure oxygen, or to a lesser extent highly oxygen enriched compared to atmospheric air typical to engine intake. The idea is to remove, within practical limits, all of the nitrogen content from the inlet air stream into the engine, recognizing that complete $N_2$ removal probably is not cost effective, nor completely necessary and recognizing the limits of current equipment available to accomplish this task and the continued development of better equipment in the future.

The type of oxygen generator used is not critical to the way the technology works, but will be important to real life applications of the technology. There are many types of oxygen generators/concentrators available today, and there will be new technologies available in the future. Power consumption will affect the overall system efficiency and, therefore, needs to be considered. The system also needs to be able to supply the gases as described in the "Gases Entering the Engine" section. If these two parameters are met, the device will be adequate to support the technology. Other parameters such as packaging will need to be considered to meet the needs of the end user.

Of the known technologies available today, Ceramic Oxygen Generating System or COGS would be the preferred type. This system has the fewest moving parts, the most efficient use of energy, very compact and is flexible in terms of packaging. Plus it puts out nearly 100% pure oxygen.

2. Gases Exhausted by the Oxygen Generator

The exhaust gases given off by the oxygen generator will vary depending on the type of system used, but generally, they will have a higher concentration of nitrogen than the atmosphere, because most or all of the oxygen has been stripped away. Certain systems will remove only the $N_2$ and send the rest of the gases to the engine, and yet others will remove all the oxygen, send it to the engine, and exhaust everything else in the atmosphere. These gases will be relatively cool (less than about 200° F.) and at least about 4 times the volume of oxygen entering the engine. Because these gases are flowing and need to be moved, they might pass through the exhaust condenser (see description of FIG. 1, below) to assist in cooling, but this is not required.

It is reasonable that the exhaust of these gases could be to waste (the atmosphere), as this should not cause any significant pollution issues, or likewise it is conceivable that a stream of (nearly) pure nitrogen gas could be captured for alternative use(s). This decision could differ for mobile versus stationary engine applications, with intuitive reasoning suggesting that large stationary applications such as generators or compressors could yield vast supplies of nitrogen gas for industrial use.

The issue of primary importance is that by precluding the entry of nitrogen into the combustion process, combustion byproducts containing nitrogen ($NO_x$ being prime example) can be drastically reduced or eliminated.

3. Gases Entering the Engine

As with the gases in the oxygen generator exhaust, the gases that enter the engine will vary depending on the type of system used to concentrate the oxygen. Some systems will allow only oxygen to enter the engine, others will remove the majority of the nitrogen, but let everything else enter. It appears that the higher the concentration of oxygen, the better the process works. In a real life application, there may be limits to how much or what percentage of the mixture will be oxygen and the system will have to be adjusted.

Pure oxygen is desired for several reasons: lower volume of gases that enter the cylinder and lower energy required to compress those gases. Oxygen is the only component from the atmosphere that is needed for combustion to take place. This will allow for a pure, clean rapid and complete combustion of any fuels present. The presence of nitrogen allows for $NO_x$ to be formed, which is undesirable. Given that there should be an excess amount of oxygen supplied to the engine so that complete and rapid burn can be assured.

Research has presented two realities that must be dealt with: (1) in the presence of highly oxygen enriched air, fuels are very volatile (explosive), and (2) mixing of the fuel and oxygen outside of the combustion chamber is not a safe proposition. These items result in: (1) the ideal engine should have direct injection of the fuel into the combustion chamber, and (2) less volatile fuels can or perhaps should be used for this process, the topic of Item 4 below.

This same research has indicated that if the air entering the engine is mostly or entirely oxygen, while combustion is rapid and thorough, there seems to be a significant shortage of mass to expand to cause the driving of the power stroke. In other words, in the presence of fuel and oxygen only, fuel efficiency and power output are actually reduced. Items 6 and 8 speak more specifically to this topic.

The use of water in the expansion part of the process will make the engine less sensitive to hot gases entering through the intake. Typically, if the intake gases become too hot during any processing before entering the cylinder, they need to be cooled. This is removing energy from the system. If these gases do become hot during any processing, they can still enter the cylinder and the water will change that thermal energy to pressure energy, just the same as it does with the heat created during combustion. This ability will add to overall engine system efficiency.

4. Fuels

The present technology will allow for a much broader range of fuels to be used for combustion. The ignition temperature of a given fuel (or all fuels in general) will be significantly lower in the presence of higher oxygen concentrations. This provides much easier ignition and much faster and more thorough combustion. The suggestion is that this process will make a fuel, such as diesel for example, a preferred fuel over gasoline or propane, even in environmentally sensitive applications. Since these heavier fuels are inherently less expensive to the refining process than the higher volatility fuels, the net will be a reduction in fuel cost. These fuels also are higher in energy content per unit volume, so efficiency gains are assured if measured on unit work per unit volume basis.

Increasing the speed of the burn will allow engine timing to be retarded to at or after top dead center to increase efficiency without decreasing power. (The piston is not working against the explosion for the last part of the compression stroke.) The rapid burn moves through the volume faster, so it is possible and desirable to start the burn later in the cycle just as, or after, the piston has reached top dead center. This is discussed in more detail below.

The more thorough combustion will result in less hydrocarbon and CO emissions, which is an environmental improvement, and will increase efficiency because the fuel will be used more completely. The ease of ignition relates to increased ability to burn fuels that would not normally be consider acceptable fuels for an internal combustion engine. This includes, for example, alcohols that contain water, which would be a significant boon to the ethanol industry given that additional processing would not be required to remove the 5% of water from the distilled alcohol, saving expense. We shall revisit the notion of water in the fuel again in Item 6 to follow. Petroleum and plant based fuels that would normally burn too slowly or not be able to ignite in an engine environment would become plausible candidates to fuel this engine. This could lead to significantly decreased cost in fuel production.

In addition to combustibility issues with the fuels discussed, the probability of post-combustion products can be significantly reduced, potentially making fuels that are currently environmentally disqualified from consumption becoming fuels of actual environmental favoritism. This will be expanded in Items 10 thru 14.

Lastly, it is intuitive that the fuel of choice for this process could be a modification, mix, or morphing of current fuels to a fuel more easily produced or perhaps produced by an alternative method of refining. Biological fuels will no doubt be usable in a much less refined state than currently required.

5. Direct Fuel Injection

The oxygen rich environment of this engine system causes a mixture of fuel and oxygen to be extremely unstable and volatile and, therefore, fuel will need to be directly injected into the cylinder at or just before the time that ignition is to take place. This will eliminate the chance of the mixture igniting before it is intended to, such as in the intake manifold of the engine if fuel is presented upstream from the combustion chamber itself. This problem was the reason that research abandoned a spark ignition, gasoline powered engine that mixed air and fuel outside the cylinder in favor of a direct injected diesel engine for testing.

This not to say that highly volatile fuels could not be used if a means of direct injection into the combustion chamber were available. But one might question why one would choose such fuels if heavier fuels can be made more volatile when in the oxygen rich environment.

6. Water Injection

As previously mentioned, combustion of pure oxygen and fuel in the chamber seems to lack the expansive properties needed to drive the piston downward, thus turning the crankshaft. Secondly, another principle of the invention is that by reducing the amount of gas (air) to be compressed by the engine, one can reduce the wasted work that the engine is doing just to make it possible for the gas to ignite and expand. It, therefore, became apparent that we needed to insert (inject) into the process a substance that occupied little space but has enormous expansive capability when heated. This substance should probably be a liquid, which is quite dense, compared to air gasses, should be virtually cost-less to avoid additional fueling costs, and has to be readily and continuously available to the process.

This quite accurately describes water, and perhaps uniquely water. Water is many times denser than air, so that it can be injected into the chamber without occupying much volume to additional compression is avoided; it is very expansive as it shifts from liquid to gaseous state (600:1 expansion ratio); and it is quite inexpensive and in fact a byproduct of the very combustion process addressed herein.

Water will be used in this engine system as an expansion material. It will be used to convert heat energy to pressure energy by expanding it rapidly from liquid to vapor. Heat energy normally is lost through the cooling system, exhaust gases, and the engine structure itself. By putting water into the cylinder, and letting the water absorb the heat created by combustion, and convert to steam, the water's volume will expand greatly. Because the cylinder volume is restricted, steam will create pressure that the engine will convert into rotational energy. The amount of water needed will be determined by the amount of heat created by the combustion. The more heat energy converted to pressure, the better, which means that the amount of water should continue to increase until there is not enough heat left to change the water from a liquid to steam. Thus, this engine can be quite powerful at quite low compression ratios.

The engine system will need to contain a method of controlling the freezing of the liquid water to eliminate the risk of damage to the components if they should freeze with water in them. One method would be purging the system at shutdown of water in any critical areas. This could mean that the entire engine system would be drained of water used in the injection system. As soon as the engine starts running, it will again start to produce water for use. (See section on the Exhaust Condenser for more details.)

While introduction of water into the combustion process is not new (especially in high performance diesel engines) the aggressive burning of the fuel in the high oxygen atmosphere of this process seems to allow the ratio of water to fuel to increase significantly over current practice. Current literature indicates max fuel to water ratio may be 2:1, while current research indicates that the engine may sustain ratios more in the range of 1:5 (fuel to water). These high ratios would doubtless extinguish the flame in a typical combustion engine, but can be made possible in the highly oxygen enriched engine. The source of this amount of water is the topic of Item 13 below, but for now we should say that it is not intended that the water be stored in mass quantities upon the vehicle, but rather harvested from the exhaust gasses from the process.

7. Timing for Fuel and Water Injection

It is known that advancing the timing on an engine gives the fuel more time to burn and, therefore, is able to burn more fuel, producing more power. It also is known that retarding the timing will increase an engines' efficiency, because less combustion has occurred before top dead center. The high concentration of oxygen used with this new technology causes combustion to take place so fast that is it possible to get complete combustion even with the timing set to start after top dead center, thus enabling further gains in efficiency. Ignition timing could be set at current typical prior to top dead center or after top dead center or any time in between.

8. Re-Circulated Cooled Engine Exhaust Gases

We can anticipate that in addition to oxygen and water, some additional volume of gas may be required to enhance the expansion during the power stroke. Ideally this would not come from atmosphere, which would introduce nitrogen into the system.

There will be cooled exhaust gases available to re-circulate back through the engine, if needed. These gases will be ostensibly nitrogen free. These gases may need to be re-circulated as an inexpensive way to increase compression, if it is needed for ignition of a compression ignition engine. Recirculated gases also may be used if extra expansion material is needed to finish converting energy from heat to pressure. These gases would be collected from the exhaust condenser (see description of FIG. 1, below), which implies that they will be cooled to some degree from the exhaust temperature. However, we can see that overall energy efficiency would probably benefit if the gasses were not too cool when re-introduced, so that they need not be reheated by burning fuel. It should be noted here, that it is expected that the exhaust gas temperature from this engine process would be much lower than currently expected from an engine, due in some part to the injection of water into the combustion process.

It is conceivable that the recirculation of some portion of the exhaust gas could be a potential process for re-combustion of some portion of the particulate matter in the exhaust, leading to lower overall particulate emissions.

9. Engine Cooling Losses (Heat Loss)

The amount of energy needing to be dissipated through the engines cooling system will be noticeably less than current engines. The reason is that this technology will convert more of the heat energy into usable output energy, and secondarily because with the lower combustion temperatures expected, the temperature of the engine parts will not be likely to rise as high as current engine must. Reducing the size of the cooling system will reduce the cost of the engine system, and have the secondary efficiency advantage of consuming less energy to power the fans that typically cause airflow through heat exchangers.

As discussed earlier, if the operating premise is to heat water to steam, then the exiting of steam from the engine will be carrying a good deal of heat with it, thus tending to cool the engine also. Lastly, if the process is more efficient, a given amount of power should come from a relatively smaller engine—a smaller engine should mean less cooling requirement.

10. Engine Configuration

The overall construction of the engine will be similar to today's modern internal combustion engine. There are some changes required and some that are possible. This technology will increase the power density of the engines. This will allow the size of the engine to be decreased and still produce the same amount of power, or alternatively produce more power in the same size engine. This will allow more power in an application where size or weight of the engine is a limiting factor, such as, for example, boats or aircraft. The increased power density will help to cut cost and weight from the vehicle.

Depending on how the water enters the engine, it could have an effect on the components in the cylinder. Cylinder walls, piston, and rings may need to be made of (or plated with) stainless steel, chrome, or ceramic type materials to prevent damage that could decrease the life of the engine.

Major characteristics of the engine could include the following:

It may be spark or compression ignition type.

Presence of high amounts of water in the combustion & exhaust systems will require special considerations.

Lower compression ratios that should be inherent to the process will allow the compression ignition engine to be much less structurally robust than current diesel engines—thus netting a lighter, less costly engine with higher power to weight ratio than current diesel engines.

It will most probably be an engine with fuel injection directly into the combustion chamber.

It will probably require a secondary injection system that will inject water directly into the combustion chamber at a prescribed time, location, and droplet size, all of these coordinated with fuel injection parameters. Since a significant purpose of the fuel burn is to heat the water to steam, one can see that the interplay of the fuel and water injection will be important.

It will likely be a multi-fuel engine, in that it may not be as particular as to the specific type or grade of fuel that is consumed, perhaps even on a random basis, except within the limits of the fuel injection system.

Special considerations for the components that input the water to the system will have to be given in dealing with the issue of freezing and bursting in cold climates.

The performance net of all this should be an engine that manifests many of the following performance characteristics when compared to current IC engines.

No Nitrous Oxide emissions

Reduced particulates in exhaust

Higher fuel efficiency due to:
    Reduced compression requirement
    Ability to burn fuel in the immediate presence of water due to the very high concentration of oxygen
    Expansion of water to steam
    Decrease of wasted heat energy
        Lower exhaust temperature
        Reduced cooling requirement
        Reduced exhaust volume Opportunity for liquid exhaust filtering for particulate emissions may allow off-road vehicles to "waste" particulates to soil with no environmental risk For on-road vehicles or stationary applications, we may be able to filter the particulates from the liquid water and waste to controlled disposal, much like current oil filters.

In summarizing overall engine implications of this process we offer the following:

Lower structural strength—lighter, cheaper

Reduced displacement for given power—lighter, cheaper

Efficient and effective, actual reduction of harmful emissions even after removal of many of today's efficiency robbing pollution abatement devices.

Carbon monoxide formation should be minimal or nonexistent

11. Excess Exhaust Gas

Not all of the exhaust will need to be cooled by the exhaust condenser to condense water vapor back to a liquid for reuse, because as the engine burns fuel, the hydrogen molecules in the fuel will combine with oxygen to form more water. There will be excess water in the system and will need to be exhausted from the engine system. In addition to water vapor, the excess exhaust primarily will consist of $CO_2$. There will be little to no $NO_x$ molecules because little to no nitrogen will enter the system. CO and hydrocarbon emissions will be very low, because the system will have an excess amount of highly concentrated $O_2$ that will facilitate complete combustion of all combustible materials within the engine.

The % of the full exhaust that will be released to atmosphere probably will be quite dependant upon the amount of water that is required to be harvested and injected back into the process. We would probably not want to cool and condense any more of the exhaust than was necessary, to save wasted cooling energy. This wasted exhaust also is a source of heat energy leaving the system, just as current exhaust exits a large amount of heat energy.

An additional note: It may be desirable under given circumstances to waste little or none of the exhaust, putting it all through the condenser to remove excess water that is then used to waste particulates to the "ground" as mentioned above in the off-road application. (As a random for instance: a farm tractor could consume High Sulfur Diesel fuel, capture the sulfur in the exhaust condenser, and just wash it out onto the ground as a source of micro nutrient sulfur for the subsequent crop to be grown on the land.)

12. Exhaust Condenser

The exhaust condenser will be used to cool exhaust gas from the engine and, thus, to condense water vapor back to a liquid state so it can be used again by the engine as an expansion material. This device (similar to current air-to-air inter coolers) will require a cooling airflow, and may represent a large part of the cooling needed for the engine. Cooled gas exits the unit for re-combustion (as required), as does liquid water for re-injection into the process, and liquid water to be wasted as discussed earlier.

This condenser now can be seen as a renewable source of water used in combustion, so that the water need not be stored or supplied externally. It also is not unreasonable to notice that we have a water manufacturing plant here that could under some circumstances be used as a fresh water source. It will need to contain a method of controlling the freezing of the liquid water to eliminate the risk of damage to the components if they should freeze with water in them.

13. Cooled Exhaust from Exhaust Condenser

In the process of condensing water out of the exhaust, the other exhaust gases will be cooled as well. The majority of the gases will consist of water vapor and $CO_2$. If needed to aid in the combustion or expansion processes, these gases could be returned to the intake of the engine as a source of nitrogen free gas. The mixture could include some amounts of particulate and other gases from impurities in the fuel. This gas may also have elevated static pressure, which suggests that it might somehow be used to "supercharge" the inlet process.

14. Water from Exhaust Condenser

This water will be quite pure, because it is distilled. It may contain some particulate matter that will be circulated back to the engine or it could be filtered to remove particulates, if necessary, and then returned to the engine, or to alternative uses as discussed earlier. We would offer that the water should be kept at a temperature rather near the boiling point to reduce cooling requirements and to reduce energy needed to expand it to the vapor state. Since water as a liquid is incompressible, nothing is to be gained by cooling it below its return to liquid, unless there are engine cooling ramifications.

As discussed earlier, the amount of water to be condensed will be regulated by the % of total exhaust that is allowed to pass through the condenser, and of course by the amount of cooling flow provided to the condenser.

The issue of freezing will be important to this part of the system, when the engine is not in operation. One can envision the development of systems to waste the water upon shut down, or of "freeze proofing" the design by allowing for the expansion of the water to ice, or even to providing heaters to prevent the freezing. One might also displace the water with fuel or some other substance in some sort of shut down routine.

15. Excess Water from Condenser

There will be or can be excess water condensed from the exhaust gas condenser. This water will be quite pure because it is distilled. It may contain some particulate matter that will be circulated back to the engine or it could be filtered. A control system could be implemented that would only allow the amount of water needed to put back into the engine to be produced. This will work fine if that amount of processed exhaust gas produces enough cooled exhaust for the engine. It has not been determined if the engine needs any cooled exhaust gas. If no control system is implemented or if the engine needs more cooled exhaust and excess water condensate is produced, then the excess will have to be disposed of properly. It could be allowed to drip onto the road surface, used for cooling or other functions. It may contain small amount of carbon particulates, which could be filtered out for proper disposal if required.

16. Heat Rejected from Condenser

The heat rejected from the condenser will be the amount of cooling needed to condense water from the exhaust gas or to provide enough cooled exhaust gas if required. We anticipate that this will be a forced air heat exchange, with the excess heat being exhausted to atmosphere. It could well be a (the) source of supplemental heating of the passenger cabin, given that exhaust gasses are much safer from this engine compared to gasses from current engines.

17. Summary of Suspected Efficiency Gains

Modern engines reject a lot of heat. The majority of the heat comes from two separate processes that occur in the engine. The first is preparing the intake gases for combustion. On naturally aspirated engines, this means filtering it for particles, and transporting it to the cylinder. During this time, the gases are heated to a temperature greater than atmospheric, but lower than the engines operating temperature, which is generally around 200° F. This process does not create much heat and is quite efficient.

For intake gases on supercharged or turbocharged engines, this air temperature becomes much hotter, as they are processed and compressed, therefore, typically needs to be cooled before entering the engine. This heat that is rejected shows that this process is inefficient. It is known that engines perform better and can produce more power if they have a charged intake. It effectively increases the size of the engine because there are more atmospheric gases in the cylinder before compression starts than if it were naturally aspirated. This means more fuel will be able to be burned, and more pressure will be built, making more power. The increased pressure also increases the temperature and this speeds up the combustion rate.

When the intake gases are mostly oxygen, they can be at a smaller volume than the volume of cylinder creating a vacuum, and still create a faster and more thorough combustion than just charging the cylinder. There is an added benefit in that the engine does not have to move and compress all of that air, which takes energy and makes heat.

If the cylinders were allowed to fill completely with pure oxygen at atmospheric pressure, that would be equivalent to five times the amount of oxygen of a modern engine without being charged. This would probably cause pressures to build excessively and cause mechanical failures, if enough fuel was added to consume all the oxygen. However, if mechanical parts were strengthened to handle these pressures, this technology would still allow engines to be charged.

18. Exhaust Gas Heat Loss

Modern engines have very high exhaust temperatures and this is wasted energy. By adding water to the cylinder to be converted to steam, this thermal energy is being converted to pressure. Exhaust temperatures will now be just over that of steam at atmospheric pressure.

19. Work Performed

The work being performed by the engine is no different than current technologies allow. Currently the engines and what they drive are designed to have performance characteristics that suit the job being done. This will happen the same way with this new technology, even if the engines performance characteristics are different. The speed and fueling curves will need to be optimized to fit every application as is done today. It may work out that the drive train may need very few changes, or the changes may be considerable. The new technology was not designed to fit any specific type of load or power requirement, it was only intended to lower emissions and increase efficiency.

II. Engine Components

Referring initially to FIG. 1, an internal combustion engine, 10, as disclosed herein, is represented in simplistic cross-section of a cylinder or combustion chamber, 2, a piston, 4, valves, 6 and 8, and a connecting rod, 9. A rotating shaft assembly, 11, is shown for converting the energy generated in cylinder 2 to work, 13. Conventional cooling is supplied to cool cylinder 2 from a cooling supply, 15. Fed to the combustion chambers (cylinders) of engine 10, for example, via an injector, 17, are a fuel, 12, water, 14, and oxygen ($O_2$), 16, though not necessarily in the order listed. Oxygen 16 is in situ generated by an oxygen generator, 18, which takes in atmospheric oxygen, 20, and exhausts a nitrogen gas stream, 22, along with a flow of oxygen 16 desirably of at least about 95% purity. Combustion by-products, 26, from cylinder 2 are withdrawn via outlet valve 6 while cylinder 2 optionally also can be fed with recirculating exhaust gas, 24, described later.

Exhaust 26 can be exhausted to waste, 28, for venting to the atmosphere, for further processing, for storage, or the like. Alternatively, energy from exhaust 26 can be captured by passing exhaust 26 through a condenser, 30, from which is removed a waste heat, 32, cooled exhaust gas, 34, for forming recirculating exhaust gas 24, and liquid water, 34, for forming into water 36 for admission as water 14 into cylinder 2, as described above.

III. Two-Cycle Engine

Referring now to FIGS. 7A and 7B, which should be read in connection with associated FIGS. 2-6, the 2-cycle exhaust stroke starts (box 40) when piston 4 is at the bottom dead center after the power stroke concludes (box 42) as illustrated in FIG. 2. Chamber 2 is full of spent combustion gases (box 44). At this time, the exhaust stroke commences as piston 4 commences its upward travel in the direction of the arrow in FIG. 2, as exhaust valve 6 opens (box 46) and exhaust gases are forced out of chamber 2 via exhaust valve 6 (box 48). The pressure in cylinder or chamber 2 is reduced by the exhausting of spent combustion gases (box 50).

During the upward stroke of piston 4 at a pre-determined location (time), intake valve 8 opens and a pressurized flow of oxygen 16 flows into chamber 2 even as the last of the spent combustion gases are exiting (box 52). A small increment of time later, exhaust valve 6 closes while additional oxygen 16 (see FIG. 1) flows into chamber 2 (box 54). Next, intake valve 8 closes and piston 4 finishes its stoke, compressing the gases in chamber 2 (box 54). Piston 4 now is at top dead center (FIG. 4).

Continuing with FIG. 7B, at or slightly after top dead center, fuel 36 is injected with injector 17 (box 58) into chamber 2. Ignition results in chamber 2 and combustion commences (box 60) and piston 4 is driven downwardly (box 62). Incrementally after ignition (see FIG. 6), water 14 is injected as a fine mist to begin to absorb the heat of combustion and be converted into steam (box 66). The generated steam in cylinder 2 expands further driving down piston 4 toward bottom dead center. The cycle, then, is complete (box 68) and the cycle returns to start (box 70).

III. Four-Cycle Engine

Figure 13A:
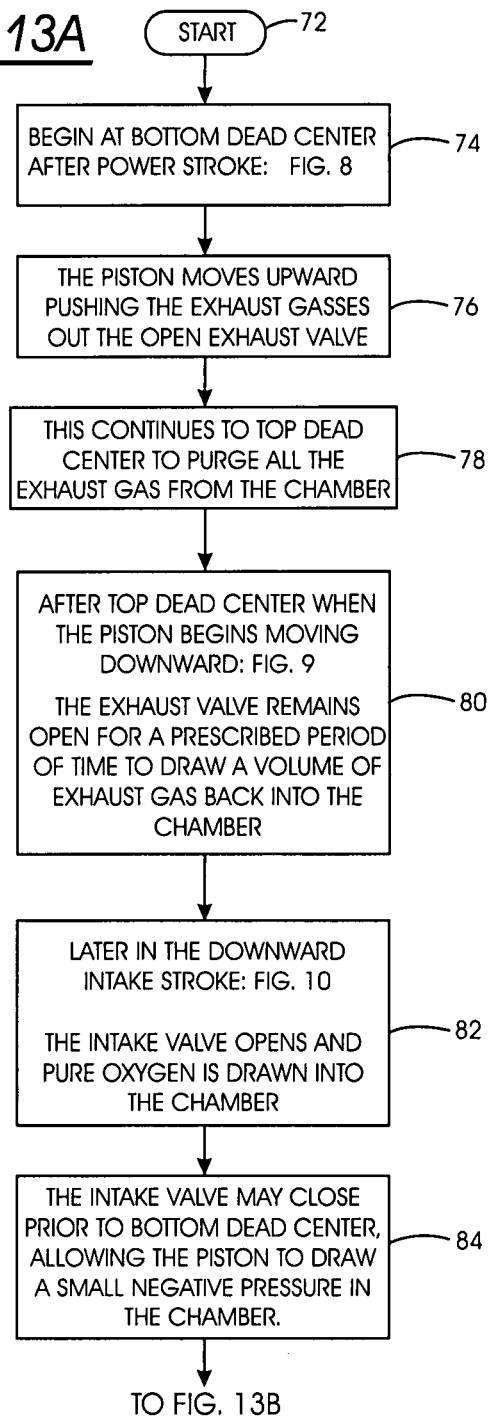

Referring now to FIGS. 13A and 13B, which should read in connection with associated FIGS. 8-12, the 4-cycle power stroke starts (box 72), where piston 4 is at bottom dead center after a power stroke has concluded (box 74). Piston 4 moves upwardly pushing the exhaust gasses out of chamber/cylinder 2 via exhaust valve 6 (box 76). Piston 4 continues its upward travel until it reaches top dead center to purge all of the exhaust combustion gases (box 78).

Figure 9:
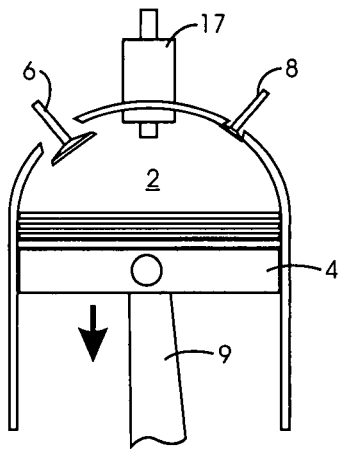
Figure 10:
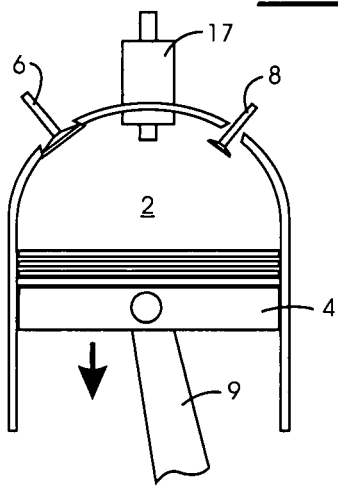

Piston 4 then starts its downward movement (see FIG. 9). Exhaust valve 6 remains open for a prescribed time while piston 4 is moving downwardly from top dead center in order to draw a volume of exhaust gases back into chamber 2 (box 80) after which exhaust valve 6 closes. Later in the downward stroke of piston 4 (see FIG. 10), intake valve 8 opens to admit oxygen 16 into combustion chamber 2. Intake valve 8 may close prior to bottom dead center to allow piston 4 to draw a small negative pressure in chamber 2 (box 84).

Piston 4 reaches bottom dead center (box 86, see FIG. 11). At this time, intake valve 8 closes and the compression stroke begins as piston 4 moves upwardly (box 88). Piston 4 continues to move upwardly until it reaches top dead center, while compressing the gases in chamber 2 (box 90). At or just after piston 4 is at top dead center is illustrated in FIG. 12 (box 92). Fuel injector 17 injects fuel 12 into chamber 2 (again, see FIG. 12) and combustion is initiated. The resulting pressure forces piston 4 to move downwardly (box 94). Water 14 now is injected as a very fine mist into chamber 2 to begin to absorb the heat of combustion and be converted into steam (box 96). The thus-formed steam expands to add additional force to drive piston 4 downwardly. Fuel and water injection continues (box 98) until piston 4 is at bottom dead center, at which time the 4-cycle power cycle is complete (box 100). The cycle then returns (box 102) to the start (box 72) and is repeated.

While the invention has been described with reference to various embodiments, those skilled in the art will understand that various changes may be made and equivalents may be substituted for elements thereof without departing from the scope and essence of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. In this application all units are in the metric system and all amounts and percentages are by weight, unless otherwise expressly indicated. Also, all citations referred herein are expressly incorporated herein by reference.

We claim:
1. A power cycle unit, which comprises:
   (a) an oxygen generator that generates a stream of greater than about 95% molecular oxygen from atmospheric air and a nitrogen waste gas stream; and
   (b) a combustion chamber fitted with:
      (i) an oxygen inlet valve through which said generated molecular oxygen is fed to said chamber,
      (ii) a fuel inlet valve through which a combustible fuel is injected into said chamber with combustion ensuing in said chamber,
      (iii) an outlet valve through which a combustion exhaust is removed from said chamber,
      (iv) a movable piston coupled to perform work, and
      (v) a water injector that injects atomized liquid water into said chamber for generating in situ steam to further drive said piston.
2. The power cycle unit of claim 1, which additionally comprises a water condenser which is fed with said combustion exhaust from said chamber to recover liquid water to pass to said water injector.
3. The power cycle unit of claim 2, which additionally comprises an exhaust condenser which is fed with said combustion exhaust to recover a cooled exhaust gas flow for admission into said chamber.

4. The power cycle unit of claim 1, which additionally comprises an exhaust condenser which is fed with said combustion exhaust to recover a cooled exhaust gas flow for admission into said chamber.

5. The power cycle unit of claim 1, wherein said oxygen generator comprises a ceramic oxygen generator.

6. An internal combustion engine having a combustion chamber, an oxygen generator that forms a stream of greater than about 95% molecular oxygen from atmospheric air and a nitrogen waste gas stream, a source of fuel, and a source of liquid water, the improvement which comprises said combustion chamber fitted with:
   (a) an oxygen valve;
   (b) a fuel valve;
   (c) an ignition source inside the combustion chamber that ignites fuel from said source of fuel and oxygen;
   (d) a water valve; and
   (e) an exhaust valve; and
   (f) a control system for controlling the combustion chamber such that:
      (1) substantially pure oxygen from said oxygen generator is allowed to enter the combustion chamber during an intake stroke, said oxygen valve closing near the end of the intake stroke to trap oxygen in the combustion chamber,
      (2) fuel from said source of fuel is allowed to start entering the combustion chamber when the piston is near top dead center, said fuel continuing to flow until enough has entered the combustion chamber to provide the power needed,
      (3) ignition timing of said ignition source is variable depending on operating conditions from slightly after the fuel starts to enter the combustion chamber to a short time after the piston passes top dead center,
      (4) liquid water from said source of liquid water is allowed to start entering the combustion chamber slightly after the ignition source starts the combustion of the fuel and oxygen and continues until after combustion is complete, the amount of liquid water entering the combustion chamber is variable depending on operating conditions, wherein fuel and water injection may occur simultaneously for some portion of the stroke, and
      (6) exhaust gases are allowed to exit the combustion chamber starting as the piston approaches bottom dead center.

7. The internal combustion engine of claim 6, wherein exhaust gases from said chamber is passed through a condenser to recover liquid water for use as said water source.

8. The internal combustion engine of claim 7, wherein a cooled exhaust gas flow is recovered from said condenser for passing into said chamber along with said molecular oxygen.

9. The internal combustion engine of claim 6, wherein a cooled exhaust gas flow is recovered from a condenser for passing into said chamber along with said molecular oxygen.

10. The internal combustion engine of claim 6, wherein said generator comprises a ceramic oxygen generator.

11. An internal combustion engine having a combustion chamber, an oxygen generator that forms a stream of greater than about 95% molecular oxygen from atmospheric air and a nitrogen waste gas stream, a source of fuel, and a source of liquid water, the improvement which comprises said combustion chamber fitted with:
   (a) an oxygen valve;
   (b) a fuel valve;
   (c) an ignition source inside the combustion chamber that ignites the fuel and oxygen;
   (d) a water valve
   (e) an exhaust valve; and
   (f) a control system for controlling the combustion chamber such that:
      (1) substantially pure oxygen from said oxygen generator is allowed to enter the combustion chamber during the last part of an exhaust stroke after the exhaust valve closes, said oxygen valve closing near the end of the exhaust stroke to trap the oxygen in the combustion chamber,
      (2) fuel from said source of fuel is allowed to start entering the combustion chamber when the piston is near top dead center just after the exhaust stroke, said fuel continuing to flow until enough has entered the combustion chamber to provide the power needed,
      (3) ignition timing of said ignition source is variable depending on operating conditions from slightly after the fuel starts to enter the combustion chamber to a short time after the piston passes top dead center,
      (4) liquid water from said source of liquid water is allowed to start entering the combustion chamber slightly after the ignition source starts the combustion of the fuel and oxygen and continues until after combustion is complete, the amount of water entering the combustion chamber is variable depending on operating conditions, wherein fuel and water injection may occur simultaneously for some portion of the stroke, and
      (5) exhaust gases are allowed to exit the combustion chamber as the piston approaches bottom dead center, and the exhaust valve will close prior to the piston reaching top dead center.

12. The internal combustion engine of claim 11, wherein the exhaust gases from said chamber is passed through a condenser to recover liquid water for use as said water source.

13. The internal combustion engine of claim 12, wherein a cooled exhaust gas flow is recovered from said condenser for passing into said chamber along with said molecular oxygen.

14. The internal combustion engine of claim 11, wherein a cooled exhaust gas flow is recovered from a condenser for passing into said chamber along with said molecular oxygen.

15. The internal combustion engine of claim 11, wherein said generator comprises a ceramic oxygen generator.

\* \* \* \* \*